E. H. Jaques,
Horse Power.
N° 4,051.  Patented May 16, 1845.
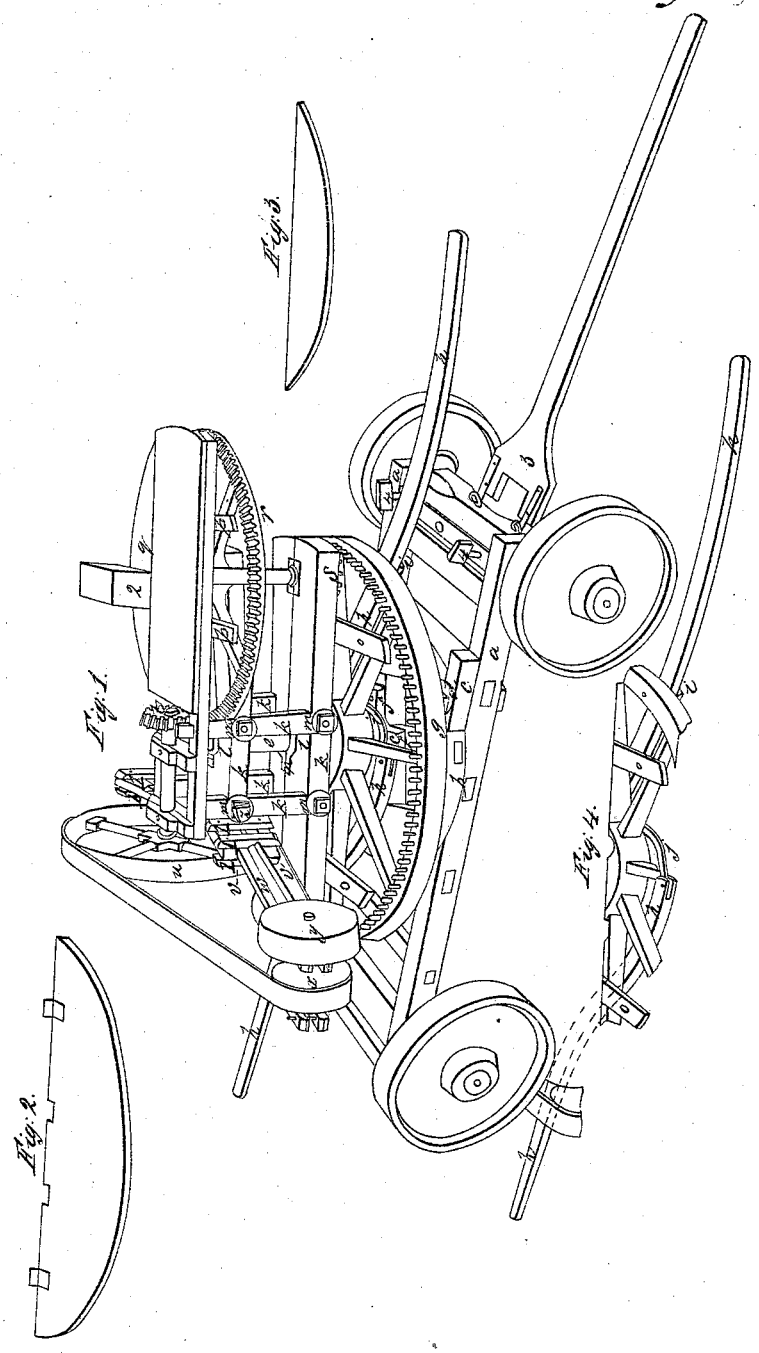

UNITED STATES PATENT OFFICE.

ELIHU H. JAQUES, OF SPRINGFIELD, VERMONT.

PORTABLE HORSE-POWER.

Specification of Letters Patent No. 4,051, dated May 16, 1845.

*To all whom it may concern:*

Be it known that I, ELIHU H. JAQUES, of Springfield, in the county of Windsor and State of Vermont, have invented a new and useful machine for the employment of horse-power for driving and operating circular and other saws and machines for threshing and winnowing grain and also for driving all other machines to which it is adapted, which I call by the name of "Jaques' improved portable horse-power;" and I do hereby declare that the following is a full, clear, and exact description of the construction and operation of the same, reference being had to the annexed drawings, making a part of this specification, in which—

Figure 1 is a perspective view. Fig. 2 represents a part of the covering of the lower horizontal cog wheel and Fig. 3 a part of the covering of the bevel cog wheel. Fig. 4 is a section representing the manner by which the inner ends of the sweeps or levers are connected together by a joint link.

$a$ $a$ is a truck, the wheels of which are sufficiently low to admit of the sweep or levers passing over them.

$b$ is a circular movable frame or platform resting on the truck.

$c$ is a block fastened to the side rail of said truck of the same thickness as said platform and there is a similar one directly opposite fastened to the other side rail, the end of the block next to the outer edge of the platform is shaped to the circumference of the same, and a bolt passes through each of these blocks, quite near to the end next to the platform, with a nut screwed on to the upper end of it over a washer as seen at $d$. The object of these bolts and washers through which they pass, is to confine the platform firmly to the truck and to prevent the same from turning on said truck, while the machine is in operation—the platform is made of wood—a pin which may be made of iron or wood, also passes through the center of the platform into the central girts upon which it in part rests, which serves to keep said platform in its place while turning it so as to bring the pulley $y$ into the necessary position to belts from it to the machinery intended to be driven by said horse power. To the upper side of the platform is confined, an upright cast-iron spindle $e$, by means of bolts which pass through the arms of said spindle and the arms of said platform as seen at $f$ $f$.

$g$ is a horizontal cog wheel which has for its axis said spindle on which it turns— I make this wheel of wood and band the periphery with iron—the cogs and nave also of wood—but the latter may, as well as the periphery, be made of iron—$h$ $h$ are horizontal levers or sweeps to which the horses are attached and are hung upon the under side of the periphery of said wheel by means of bolts or pins which pass through both and a stay of iron fastened to said periphery as seen at $i$, Figs. 1 and 4—on which bolts or pins said levers slightly turn—the interior ends of these levers are on opposite sides of said spindle and are connected by means of a curved iron or joint link as seen at $j$, Figs. 1 and 4—and the ends of said levers having some play on each side of the spindle, the iron which connects them as above described, serves to equalize the draft of the horses—$k$ $k$ $k$ $k$ $k$ $k$ $k$ is a frame work of wood confined to said spindle which supports it as seen at $l$ $l$, by means of bolts as exhibited at $m$ $m$ $m$ $m$ and cast iron clamps as seen at $n$ $n$, which are thus made to firmly grasp said spindle and thereby hold and keep the frame work in its place and from turning on said spindle. $o$ $o$ are arms confined to the underside of said frame work to which are fastened the lid or covering represented at Fig. 2. $p$ $p$ are similar arms to which are fastened the lid or covering represented at Fig. 3—as well as the portion of the covering upon the opposite side of the wheel as seen at $q$.

$r$ is a horizontal bevel toothed wheel, which I make of wood but the same or any parts thereof may be made of iron, on the lower end of the arbor of which is a pinion wheel, which I make of cast iron and which meshes into the cog wheel as seen at $s$, by which it is driven.

$t$ is a bevel pinion wheel which I make of cast iron and which is driven by the bevel wheel $r$, into which it meshes.

$u$ is a driving drum attached to the opposite end of the arbor of the last mentioned pinion wheel.

$v$ $v$ are curved pieces of wood bolted to the left hand posts in said frame—to these pieces of wood and cross wire of the same are bolted six cleats, three on each side, as seen at 1, 1, 1, 1, 1, 1.

$w$ is an elevator, one end of which serves as a bearing for the arbor of pulleys $x$, $y$. The other end may be inserted between the curved pieces of wood and cleats, at either end, as occasion may require, and is fastened therein and kept from slipping by means of a bolt which passes through a slot in the elevator and through one of the cleats into a thumb nut as seen at $z$.

2 is a box or cover for the bevel pinion wheel $t$.

$y$ is the pulley from which by means of a belt or band, or chain the power may be applied to any machine intended to be operated by it—and the speed may be increased or diminished by substituting a larger or smaller pulley in the place of it as occasion requires.

3 is the neap of said truck which by being elevated sufficiently high may be liberated or unhooked from the axletree while the machine is in operation.

4, 4, are thumb screws the use of which is, when screwed down upon the axletree, to prevent the rocker from rocking on the same when the machine is in motion.

The truck may be confined to its place, while the machine is in operation, in any convenient way, so that the same be kept stationary while the horses are traveling around it and keeping the machine in motion.

What I claim as my invention and desire to secure by Letters Patent is—

1. Supporting the upper frame on, and attaching it to the spindle on which the master wheel turns in combination with the mode of connecting the spindle with the lower frame by means of a turning platform, the master wheel being situated between the two frames, and there being no other connectioin between the two frames than the said spindle, whereby the upper frame which supports the belt wheels, may be turned in any direction without moving the under frame, as described.

2. I also claim connecting together the inner ends of the levers by which the horses pull, by joints link, the said levers being jointed to the master wheel near its periphery so that the horses shall perform their proper proportion of labor, as described.

Springfield May 6, 1845.

ELIHU H. JAQUES.

Witnesses:
M. RICHARDS PORTER,
FANNY PORTER.